(12) United States Patent
Patscheider et al.

(10) Patent No.: US 12,504,620 B2
(45) Date of Patent: Dec. 23, 2025

(54) ARRANGEMENT FOR A TUNABLE LENS

(71) Applicant: Optotune Switzerland AG, Dietikon (CH)

(72) Inventors: Roman Patscheider, Winterthur (CH); Wolfgang Zesch, Dietikon (CH); Alan Cortizo, Zug (CH); Erik Hebestreit, Regensdorf (CH)

(73) Assignee: Optotune Switzerland AG, Dietikon (CH)

( * ) Notice: Subject to any disclaimer, the term of this patent is extended or adjusted under 35 U.S.C. 154(b) by 341 days.

(21) Appl. No.: 18/351,510

(22) Filed: Jul. 13, 2023

(65) Prior Publication Data

US 2024/0019682 A1  Jan. 18, 2024

(30) Foreign Application Priority Data

Jul. 15, 2022  (DE) ............... 10 2022 117 822.6

(51) Int. Cl.
*G02B 3/14* (2006.01)
*G02B 26/00* (2006.01)

(52) U.S. Cl.
CPC ................... *G02B 26/004* (2013.01)

(58) Field of Classification Search
CPC ......... G02B 26/004; G02B 3/14; G02B 26/00
See application file for complete search history.

(56) References Cited

U.S. PATENT DOCUMENTS

| | | | |
|---|---|---|---|
| 4,444,471 A | 4/1984 | Ford, Jr. | |
| 11,231,528 B2 | 1/2022 | Craen | |

FOREIGN PATENT DOCUMENTS

| | | | | |
|---|---|---|---|---|
| DE | 3788872 | | 7/1994 | |
| EP | 4020023 | | 6/2022 | |
| WO | WO2020120806 | * | 6/2020 | ............... G02B 3/14 |

* cited by examiner

*Primary Examiner* — Joseph P Martinez
(74) *Attorney, Agent, or Firm* — JMB Davis Ben-David

(57) ABSTRACT

The invention relates to an arrangement for a tunable lens, which comprises a deformable lens shaping element (1) with a central axis (2) and a radial axis (5) and with a perimetrical edge (3) that extends about the central axis (2) and wherein the perimetrical edge (3) is designed to interact and mechanically deform a membrane of the tunable lens in order to change at least one optical property of the tunable lens. The arrangement further comprises a moveable adjustment element (13), which is mechanically coupled to the lens shaping element (1) by a bearing, wherein the bearing limits an axial translational degree of freedom (7), such that an axial force is transmittable between the lens shaping element (1) and the adjustment element (13) parallel to the central axis (2) and wherein the bearing provides a radial rotational degree of freedom (12) for a relative rotation between the lens shaping element (1) and the adjustment element (13) about the radial axis (5).

23 Claims, 14 Drawing Sheets

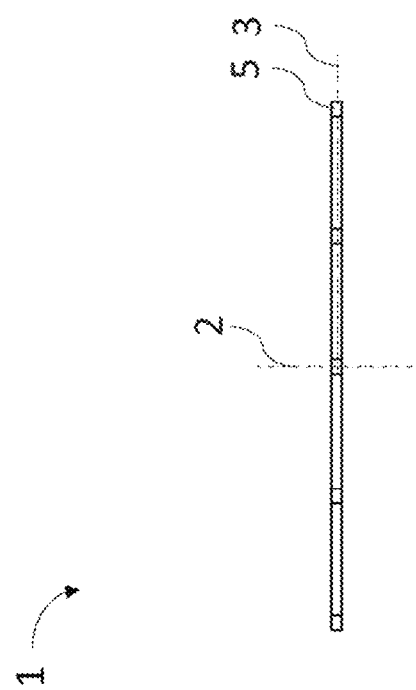
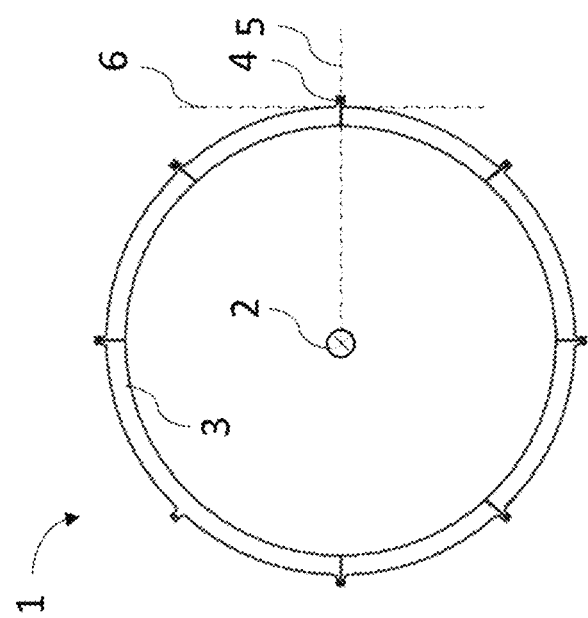
Fig. 1B
Fig. 1A

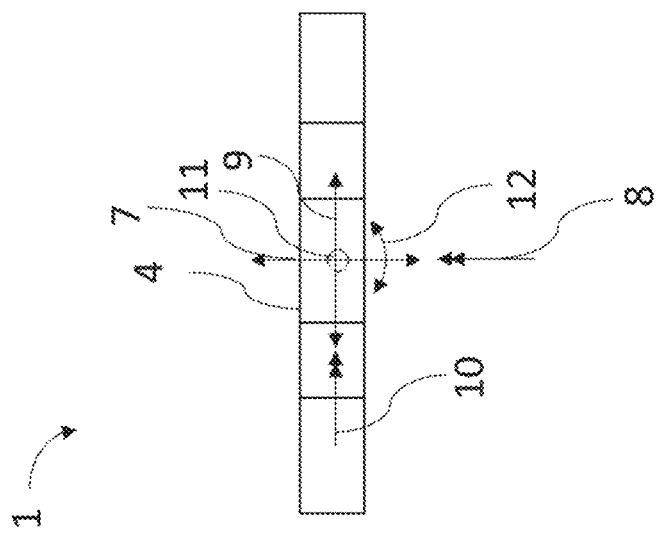
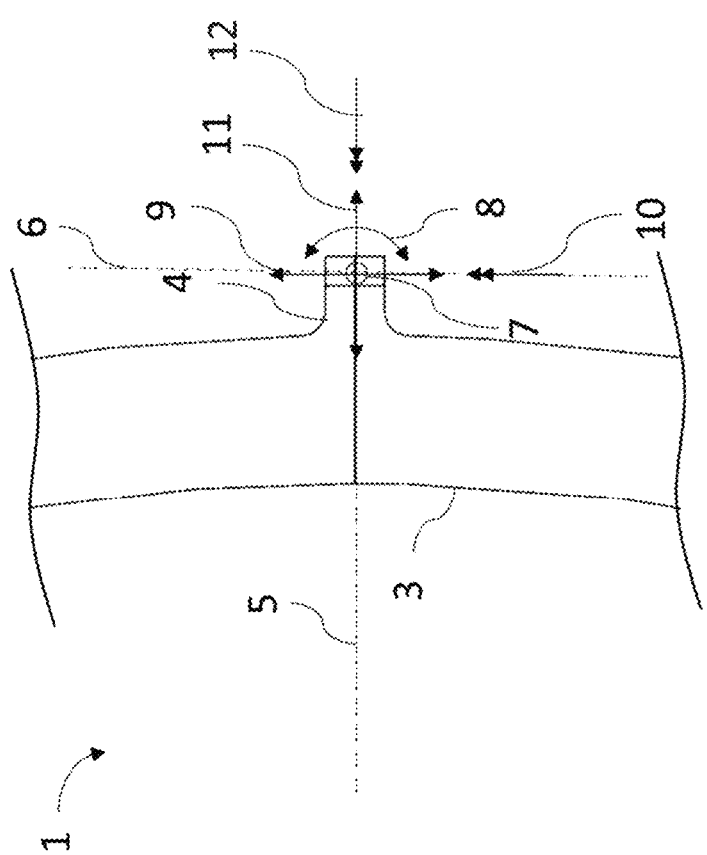

ARRANGEMENT FOR A TUNABLE LENS

CROSS REFERENCE TO RELATED APPLICATIONS

Benefit is claimed to German Patent Application No. 10 2022 117 822.6, filed on Jul. 15, 2022.

FIELD

The invention relates to an arrangement for a tunable lens.

BACKGROUND

Optical devices, particularly ophthalmic devices, might comprise a rigid lens, which focuses or disperses a light beam and can be used in various imaging devices in order to correct aberrations. Such an optical device may comprise a tunable lens with an elastic membrane that can be deformed. By such a deformation a curvature of the membrane is adjusted in order to change an optical property of the tunable lens. This particularly enables a correction of different aberrations with the same optical device, which comprises the tunable lens. In order to effect a deformation of the membrane, it is necessary to transfer a movement, a force or a torque from an actuator to the membrane and thereby set the desired curvature.

It is an object of the present invention to provide an arrangement by means of which a deformation of the membrane can be achieved in a reliable and simple manner.

SUMMARY

Based on the above, the object is solved by an arrangement for a tunable lens according to claim 1. Preferred embodiments of the present invention are subject-matter of the corresponding dependent claims.

According to the invention, the arrangement for the tunable lens comprises a deformable lens shaping element with a central axis and a radial axis and with a perimetrical edge that extends about the central axis. The perimetrical edge is designed to interact and mechanically deform a membrane of the tunable lens in order to change at least one optical property of the tunable lens. The lens shaping element extends perimetrically around the deformable membrane. The lens shaping element is elastically deformable. In particular, the lens shaping element is deformable about and/or along the radial axis and/or along the central axis. The arrangement also comprises a moveable adjustment element, which is mechanically coupled to the lens shaping element by a bearing, wherein the bearing limits an axial translational degree of freedom, such that an axial force is transmittable between the lens shaping element and the adjustment element parallel to the central axis and wherein the bearing provides a radial rotational degree of freedom for a relative rotation between the lens shaping element and the adjustment element about the radial axis. In particular, the arrangement comprises a single central axis, which coincides with an optical axis of the tunable lens. The arrangement may comprise multiple radial axes, wherein the radial axes extend from the central axes to the bearing respectively.

The invention is based on the finding that the curvature of the lens may not only be set by a uniform translation of the lens shaping element parallel to the central axis. Instead, the curvature of the lens may also be set by deforming the lens shaping element, wherein, in particular, a region or point of the lens shaping element can be displaced or rotated relative to another. In such a case, it is especially advantageous to transmit the adjustment force and/or the adjustment movement of the adjustment element parallel to the central axis as directly as possible, but still to allow a deformation of the lens shaping element about the radial axis at each bearing respectively.

The design of a bearing with the above-described properties allows a soft and continuous curvature of the elastic lens shaping element that can accordingly be transferred to the membrane. In this way, the bearing has a direct effect on improving the optical properties of the tunable lens.

The invention is not limited to a particular embodiment of the lens shaping element or the adjustment element. It is therefore within the scope of the invention that the lens shaping element is made of an elastic material and/or may have a geometry that allows an elastic deformation of at least the perimetrical edge. For example, the lens shaping element may be considered deformable, if a deformation is above 5% of a peak-valley surface sag along the optical axis.

In order to deform the lens shaping element with a smooth and continuous curvature, the bearing is designed unrestricted with respect to the radial rotational degree as described above. Compared to a bearing in which the radial rotational degree of freedom is limited, an unrestricted radial rotational degree of freedom is associated with a relative rotatability between the lens shaping element and the adjustment element. The radial rotational degree of freedom may be considered limited, if a relative rotation between the lens shaping element and the adjustment element in the bearing is not higher than 50% compared to a bearing where the corresponding degree of freedom is unrestricted when stressed by a reference torque about the radial axis. On the contrary, the radial rotational degree of freedom can be considered unrestricted if the degree of deformation is higher than 50%.

According to the invention, the adjustment element represents an interface element by means of which an adjustment movement and/or an adjustment force can be transmitted from an actuator, for example an electromechanical actuator, to the lens shaping element. In particular, the adjustment element can be guided parallel to the central axis and be mechanically coupled to the lens shaping element by the bearing.

In a preferred embodiment, the bearing provides a radial translational degree of freedom for a relative translation between the lens shaping element and the adjustment element parallel to the radial axis.

According to the above-described embodiment, the lens shaping element is movable along the radial axis with respect to the adjustment element to further improve the optical properties of the membrane to be deformed relative to the adjustment.

Furthermore, a relative moveability in the radial translational degree of freedom is useful to center the lens shaping element with respect to the central axis to further improve the optical properties of the tunable lens.

In order for the lens shaping element to deform with a smooth and continuous curvature, the bearing is designed unrestricted with respect to the radial translational degree as described above. Compared to a bearing in which the radial translational degree of freedom is limited, an unrestricted radial translational degree of freedom is associated with a relative displaceability between the lens shaping element and the adjustment element. The radial translational degree of freedom may be considered limited, if a relative translation between the lens shaping element and the adjustment element in the bearing is not higher than 50% compared to a bearing where the corresponding degree of freedom is unrestricted when stressed by a reference force parallel to the radial axis. On the contrary, the radial translational degree of freedom can be considered unrestricted if the degree of deformation is higher than 50%.

In a preferred embodiment, the perimetrical edge defines at least one tangential axis that extends perpendicularly to the radial axis of the lens shaping element. In particular, in a non-deflected state of the shaping element, the tangential axis extends perpendicular with respect to the central axis. The bearing limits a tangential translational degree of freedom such that a tangential force is transmittable between the lens shaping element and the adjustment element along the tangential axis.

Preferably, the bearing limits the tangential translational degree of freedom and allows to achieve a stiff bearing of the lens shaping element such that it cannot be rotated or deformed about the central axis. Thus, there is no rotational position of the lens shaper that needs to be taken into account in order to set a desired deformation of the membrane. Rather, a relative rotational position between the lens shaping element and the adjustment element can be set during assembly and permanently maintained by making at least one bearing of the arrangement rigid in the tangential direction. Provided that the arrangement has a plurality of such bearings between the lens shaping element and a plurality of adjustment elements, it is not necessary, however, that all of these bearings are designed to transmit tangential forces.

According to a preferred embodiment, the arrangement comprises a plurality of bearings, preferably at least six bearings, more preferably eight bearings, wherein at least three, preferably four, bearings each limit their respective tangential translational degree of freedom such that a tangential force is transmittable between the lens shaping element and the adjustment element along the respective tangential axis, and wherein each of the other bearings provides a tangential translational degree of freedom for a relative tangential displacement between the lens shaping element and the adjustment element along the respective tangential axis.

Analyses that were performed by the applicant have shown that the aforementioned design with a number of three or four force-transmitting bearings with respect to their tangential directions are advantageous for achieving good mechanical properties of the arrangement and at the same time optimal optical properties of the tunable lens. Moreover, a static over determination of the arrangement can be easily avoided, provided that only three or four of the total amount of six or respectively eight bearings are designed to transmit forces in their tangential directions.

According to a preferred embodiment, the bearing provides a tangential rotational degree of freedom for a relative rotation between the lens shaping element and the adjustment element about the tangential axis.

The aforementioned rotation between the lens shaping element and the adjustment element about the tangential axis makes it possible to avoid excessive mechanical stress on the lens shaping element about the tangential axis.

In order for the lens shaping element to deform with a smooth and continuous curvature, the bearing is designed unrestricted with respect to the tangential rotational degree of freedom as described above. Compared to a bearing in which the tangential rotational degree of freedom is limited, an unrestricted tangential rotational degree of freedom is associated with a relative rotatability between the lens shaping element and the adjustment element. The tangential rotational degree of freedom may be considered limited, if a relative rotation between the lens shaping element and the adjustment element in the bearing is not higher than 50% compared to a bearing where the corresponding degree of freedom is unrestricted when stressed by a reference torque about the tangential axis. On the contrary, the tangential rotational degree of freedom can be considered unrestricted if the degree of deformation is higher than 50%.

In a preferred embodiment, the adjustment element has at least an axial abutment for the lens shaping element, which is arranged to limit the axial translational degree of freedom.

With the further development described above, it is possible in a structurally simple manner to limit the degree of freedom in the axial direction by providing a mechanical stop element on the adjustment element into which the lens shaping element can come into contact in order to transmit the adjustment force and/or the adjustment movement of the adjustment element to the lens shaping element. In particular, the abutment of the adjustment element may have an elasticity, which is chosen to be of a magnitude that only a slight elastic deformation of the lens shaping element and the adjustment element takes place when the adjustment force and/or the adjustment movement is transmitted between them.

Preferably, the bearing has a radial rotational elasticity, which is chosen to provide the radial rotational degree of freedom and to exert a radial restoring torque about the radial axis.

The embodiment described above refers to an arrangement, whose bearing is elastically flexible with respect to the radial axis in such a way that, on the one hand, the radial rotational degree of freedom is provided and, at the same time, a restoring torque is built up by means of which the bearing can be returned to its initial state, in particular when the adjustment element is set back from a position in which a deformation of the membrane is caused to an initial position, wherein no deformation of the membrane is intended.

In a preferred embodiment, the bearing has a radial elasticity, which is chosen to provide the radial translational degree of freedom and to exert a radial restoring force parallel to the radial translational degree of freedom. Additionally or alternatively, the bearing has a tangential abutment for the lens shaping element to limit the tangential translational degree of freedom or wherein a tangential elasticity is chosen to provide the tangential translational degree of freedom and to exert a tangential restoring force parallel to the tangential axis. Additionally or alternatively, the bearing has a tangential rotational elasticity, which is chosen to provide the tangential rotational degree of freedom and to exert a tangential restoring torque about the tangential axis.

Investigations have shown that the restricted and unrestricted degrees of freedom as described above may be combined, to simultaneously provide good adjustability of the lens shaping element while exerting restoring forces and/or torques. This allows the lens shaping element to be centered in a simple manner.

In a preferred embodiment, the lens shaping element comprises at least one protrusion that extends along the radial axis. The adjustment element comprises a recess, in which the protrusion of the lens shaping element engages. The bearing is at least partially configured such that the protrusion is held in the recess, to at least limit the axial translational degree of freedom and to provide the radial rotational degree of freedom.

By means of the embodiment described above, it is possible to provide a bearing in a structurally simple manner by means of which the axial translational degree of freedom is restricted and the radial rotational degree of freedom is unrestricted.

In a simple embodiment, the protrusion preferably comprises a rectangular cross section and wherein a contour of the recess has two convex curvatures formed on two opposing inner walls of the recess. Two oppositely directed surfaces of the protrusion each partially are in mechanical contact with one of the curvatures of the inner walls of the recess.

In the manner described above, the mechanical abutment may be designed to provide a mechanical support for the protrusion by point contacts or by line contacts. Preferably, a line contact extends substantially parallel to the radial axis so that the protrusion can be tilted about said contact line about the radial axis. By providing a point contact, the protrusion may additionally be tilted about the tangential axis.

In a preferred embodiment, the protrusion comprises a groove that extends parallel to the radial axis, wherein the geometries of the groove and the curvature are chosen such that two oppositely directed surfaces of the protrusion each partially are in two mechanical contacts with one of the curvatures of the inner walls of the recess.

In contrast to an embodiment in which the protrusion is supported by contact points or contact lines within in the recess, the above-described embodiment comprises two contact points or two contact lines for each side of the protrusion. By providing two contacts on each side of the protrusion, resistance to tilting of the protrusion about the radial axis can be adjusted so that said tilting is only possible with increased force. This makes the bearing of the protrusion within the recess more stable.

In another simple embodiment, the protrusion is subdivided in two sub-protrusions that extend parallel to each other along the radial axis, wherein a geometry of the groove and a relative arrangement of the sub-protrusions are chosen such that each of the sub-protrusions is in a mechanical contact with the two curvatures of the inner walls of the recess.

Similarly to the embodiment of the protrusion that comprises a groove, a spatial separation of the sub-protrusions also allows and adjustment of a resistance of the bearing to tilting of the lens shaping element about the radial axis. A larger distance between the sub-protrusions is associated with an increased resistance to a tilting motion according to the radial rotational degree of freedom.

In a preferred embodiment, the bearing comprises a radial boom that is arranged between the lens shaping element and the adjustment element, wherein the radial boom extends parallel to the radial axis and is disposed outside of the recess. Furthermore, the elastic boom may have at least the radial rotational elasticity, which is chosen to provide the radial rotational degree of freedom and to exert the radial restoring torque about the radial axis.

The above-described embodiment is not limited to how the radial boom is particularly designed. In a simple embodiment, the radial rotational elasticity of the radial boom can be determined as a function of a material and/or its geometry. In a simple embodiment, the boom has a substantially rectangular cross-section. Preferably two radial booms are disposed outside of the recess on two different sides of the adjustment element, to generate the radial restoring torque.

It has proven to be particularly advantageous if the boom is designed as an integral part of the tunable lens and are thereby connected to an area of the tunable lens which serves as a bellow. The bellow typically delimits the internal space of the container, in which a transparent liquid of the tunable lens is contained. A particular advantage is that the bellow is elastic due to its function for the tunable lens and that this elasticity can be used for the radial boom.

Alternatively or additionally, the bearing may comprise a tangential boom, preferably two tangential booms, that extends from the protrusion parallel to the tangential axis and wherein the tangential boom engages in a cavity of the recess. The tangential boom preferably has at least the radial rotational elasticity, which is chosen to provide the radial rotational degree of freedom and to exert the radial centering torque about the radial axis.

According to the further development described above, the recess of the adjustment element can be used on the one hand to accommodate the protrusion and, for example, to form the axial abutment by means of the curvature described above. On the other hand the recess is useable to accommodate the tangential boom in order to effect the restoring torque in the event of a relative rotation of the lens shaping element with respect to the adjustment element about the central axis.

In a preferred embodiment, the recess is open on one side in the tangential direction. Such an embodiment of the adjustment element allows an easy assembly of the bearing, in which in particular the protrusion along the tangential direction can be inserted into and retained in the recess.

In another embodiment, at least one of the curvatures at least partly comprises a spherical geometry and/or a cylindrical cross section. The aforementioned spherical or cylindrical geometries are easy to manufacture and allow the setting of a high stiffness, which is particularly favourable for the design of the abutment in the axial direction.

In another preferred embodiment, the protrusion comprises a spherical element that is supported within the recess.

The above-described embodiment may comprise a bearing that is comparable to a ball joint. In this case, the protrusion can have a ball element attached to its radial end and which is arranged within the recess. The recess has, at least in sections, a cross-sectional geometry corresponding to the spherical element so that the protrusion with the element can be fitted into the recess and held therein. Such a bearing provides the radial rotational degree of freedom and at the same time limit the axial translational degree of freedom.

Preferably, the recess is undersized in at least one dimension compared to the spherical element. This allows to avoid backlash effects in the bearing. The recess and/or the spherical element may be lubricated in order to adjust a tribological property of the bearing and to improve static friction and/or wear.

In a preferred embodiment, the protrusion divides the spherical element into two hemispheres, wherein the protrusion has an elasticity that is chosen to bias the hemispheres within the recess against two opposing inner walls of the recess.

With the design described above, it is possible to enable a clearly defined positioning of the lens shaping element relative to the adjustment element along the central axis. Preferably, the elasticity of the protrusion is selected in such a way that the protrusion may be compressed, to arrange the protrusion and both hemispheres within the recess. In particular, the elasticity of the protrusion may have a degressive or a progressive or a linear spring characteristic.

In another embodiment, the protrusion is subdivided in two sub-protrusions that extend parallel to each other along the radial axis and wherein each of the sub-protrusions is attached to one of the hemispheres and wherein the sub-protrusions are elastically preloaded such that such that the hemispheres are biased within the recess against two opposing inner walls of the recess.

The further development described above makes it possible in a particularly simple manner to bias the two hemispheres against the walls of the recess. In particular, the sub-protrusions can be formed during their manufacture as elements that are pre-loaded relative to one another and exert a spring force when deformed. The hemispheres can be connected to the sub-protrusions in such a way that one of the hemispheres is connected to one sub-protrusion and the other of the hemispheres is connected to the other sub-protrusion.

In another preferred embodiment, the arrangement comprises a membrane of the tunable lens. Furthermore, the protrusion and the membrane at least partially extend parallel to each other within the recess and divide the spherical element into the two hemispheres, wherein one of the hemispheres is attached to one of the membrane and the other hemisphere is attached to the protrusion. At least the membrane is elastic such that such that the hemispheres are biased within the recess against two opposing inner walls of the recess.

The above-described further development has an advantage that is linked to a high functional integration. This is because an elastic property of the membrane can be exploited on the one hand for setting an optical property of the tunable lens and at the same time for biasing the hemispheres. Therefore, there is a possibility to dispense with further elastic elements by means of which the hemispheres inside the recess are pressed against its walls.

In a preferred embodiment, the recess is at least partially filled with a rigid bearing material, which is in contact with the protrusion, preferably enclosing the protrusion about the radial axis. The bearing material has the axial elasticity that is chosen to limit the axial translational degree of freedom. The protrusion has a radial rotational elasticity, which is chosen to provide the radial rotational degree of freedom for a relative rotation between the lens shaping element and the adjustment element about the radial axis.

The above-described design is accompanied by the advantage of a high degree of achievable functional separation. This results from the fact that the rigid bearing material allows a direct transmission of forces between the lens shaping element and the adjustment element parallel to the central axis. The relative rotatability of the lens shaping element and the adjustment element can be adjusted independently of the rigid bearing material solely by a suitable design of the protrusion, in particular depending on the choice of material and/or its geometry.

In another preferred embodiment, the lens shaping element comprises at least one recess and the adjustment element comprises a fixation element, wherein the fixation element engages in the protrusion of the lens shaping element. The bearing is at least partially configured such that the fixation element is moveably held in the recess of the lens shaping element, in order to at least limit the axial translational degree of freedom and to provide the radial rotational degree of freedom.

In the above described embodiment, the fixation element may be similar to a pin or a rivet which protrudes the recess of the lens shaping element and wherein the geometry and/or dimensions of the fixation element and the recess of the lens shaping element are selected such that relative movement in the axial direction is restricted and rotationally released with respect to the radial axis.

In another preferred embodiment, the adjustment element and the lens shaping element are connected by the bearing and a flexure, wherein the flexure is elastic such that, in the case of a relative displacement and/or a relative rotation of the lens shaping element and the adjustment element relative to one another, at least a restoring force and/or a restoring torque is exerted on the lens shaping element contrary to the relative displacement and/or the relative rotation.

The design of the flexure is accompanied by the advantage of a high degree of functional separation. In particular, the bearing can be designed to limit relative displacement parallel to the central axis and to enable relative rotation about the radial axis, irrespective of any desired restoring forces. The flexure, on the other hand, can be used alone for the design of said restoring forces and/or torques.

BRIEF DESCRIPTION OF THE DRAWINGS

Further features and advantages of the present inventions as well as embodiments of the present invention shall be described in the following with reference to the Figures, wherein FIGS. 1A-1B show a lens shaping element for a tunable lens FIG. 1A shows the top view thereof and FIG. 1B shows the side view thereof;

FIGS. 2A-2B show a detailed view of the lens shaping element according to FIGS. 1A-1B,
FIG. 2A shows the detailed top view thereof and FIG. 2B shows a detailed side view thereof; sponge

Figure 3:
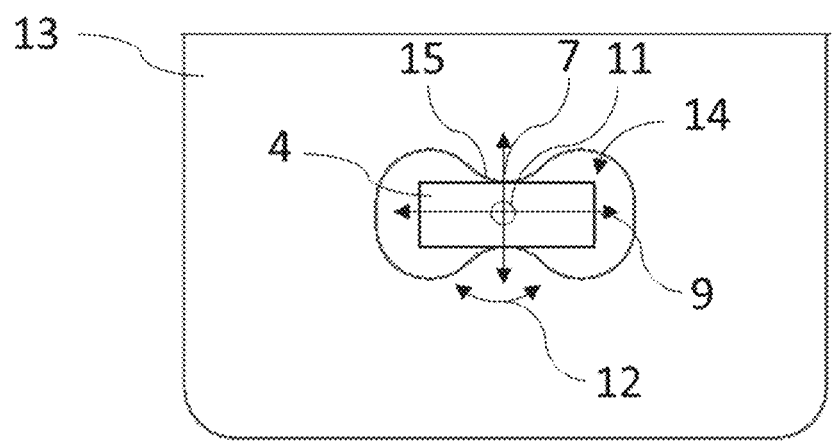
FIG. 3 shows a first embodiment of a bearing.

For better understanding, the reference numerals as used in FIGS. 1 to 14 are listed below.

1 Lens shaping element
2 Central axis
3 Perimetrical edge
4 Protrusion
5 Radial axis
6 Tangential axis
7 Axial translational degree of freedom
8 Axial rotational degree of freedom
9 Tangential translational degree of freedom
10 Tangential rotational degree of freedom
11 Radial translational degree of freedom
12 Radial rotational degree of freedom
13 Adjustment element
14 Recess
15 Curvature
16 Groove
17 Spherical element
18 Membrane 19 Rigid bearing material
20 Radial boom
21 Bellow
22 Tangential boom
23 Cavity

DETAILED DESCRIPTION

View a) of FIG. 1 shows a deformable lens shaping element 1 for a tunable lens (not shown) that comprises a central axis 2 and a perimetrical edge 3, which extends about the central axis 2. The perimetrical edge 3 is designed mechanically deform a membrane (not shown) of the tunable lens in order to change at least one optical property of the tunable lens. In this embodiment, the central axis 2 is substantially parallel to an optical axis of the tunable lens. By deforming the membrane, it is possible, for example, to adjust a focal plane of the tunable lens or to correct another aberration by deforming the membrane.

The lens shaping element 1 has eight protrusions 4 that are evenly distributed around the outer circumference of the lens shaping element 1, wherein each protrusion 4 extends along its own radial axis 5, only one of which is shown for better clarity. As can be seen in view b) of FIG. 1, the lens shaping element 1 may be essentially flat and in at least one state comprise a main extension plane, which runs parallel to the radial axis 5 and perpendicular to the central axis 2.

The protrusions 4 are each designed to interact with a moveable adjustment element 13 (see FIG. 3) that is moveable parallel to the central axis 2, wherein a bearing is at least partially defined by the protrusion 5 and said adjustment element 13. Furthermore, the lens shaping element 1 has a tangential axis 6 that runs perpendicular to the radial axis 5.

The lens shaping element 1 in general has different degrees of freedom in order to transfer a displacement or a force to the membrane of the tunable lens. According to the invention described herein, some the bearing is designed such that some of the degrees of freedom must be restricted and some other degrees of freedom are unrestricted. Before explaining which degrees of freedom are restricted or unrestricted, said degrees of freedom are defined with reference to FIG. 2.

Views a) and b) of FIG. 2 show the lens shaping element 1 with the perimetrical edge 3 and the protrusion 4 that partially extends along the radial axis 5. In general, a movement of the lens shaping element 1 can be defined by an axial translational degree of freedom 7 parallel to the central axis 2 and an axial rotational degree of freedom about an axis parallel to the central axis 2.

Furthermore, the lens shaping element 1 in general also has a tangential translational degree of freedom 9 perpendicular to the radial axis 5 and a tangential rotational degree of freedom about an axis parallel to the central axis 2.

Furthermore, the lens shaping element 1 in general also has a radial translational degree of freedom 11 parallel to the radial axis 5 and a radial rotational degree of freedom 12 about the radial axis 5.

In the embodiment shown here, the bearing arrangement comprising the protrusion 4 and the adjustment element 13 is designed in such a way that, the axial translational degree of freedom 7 is limited, such that an axial force is transmittable between the lens shaping element 1 and the adjustment element 13 parallel to the central axis 2. Furthermore, the bearing provides the radial rotational degree of freedom 12 for a relative rotation between the lens shaping element 1 and the adjustment element 13 about the radial axis 5.

Also, the bearing provides a radial translational degree of freedom 11 for a relative translation between the lens shaping element 1 and the adjustment element 13 parallel to the radial axis 5.

Furthermore, the bearing limits a tangential translational degree of freedom 9, such that a tangential force is transmittable between the lens shaping element 1 and the adjustment element 13 along the tangential axis 6.

Moreover, the bearing provides a tangential rotational degree of freedom 10 for a relative rotation between the lens shaping element 1 and the adjustment element 13 about the tangential axis 6.

In addition, the arrangement comprises eight bearings, four of which, each limit their respective tangential translational degree of freedom 9 such that a tangential force is transmittable between the lens shaping element 1 and the adjustment element 13 along the respective tangential axis 6. Each of the other four bearings provide a tangential translational degree of freedom 9 for a relative tangential displacement between the lens shaping element 1 and the adjustment element 13 along the respective tangential axis 6.

In the following, it is explained with reference to FIGS. 3 to 13 how the aforementioned degrees of freedom are restricted or designed for being unrestricted.

A first embodiment is shown in FIG. 3, wherein the protrusion 4 of the lens shaping element 1 extends along the radial axis 5, and wherein the adjustment element 13 comprises a recess 14, in which the protrusion 4 of the lens shaping element 1 engages. The bearing is configured such that the protrusion 4 is held in the recess 14, in order to limit the axial translational degree of freedom 7 and to provide the radial rotational degree of freedom 12. Furthermore, the tangential translational degree of freedom 9 is also provided by the bearing.

As can be seen in FIG. 3, the protrusion 4 extends parallel to the radial axis 5 and comprises a rectangular cross section. A contour of the recess 14 has two convex curvatures 15 formed on two opposing inner walls of the recess 14. The bearing is designed such that two oppositely directed surfaces of the protrusion 4 each partially are in mechanical contact with one of the curvatures 15 of the inner walls of the recess 14.

Thus, at least in the cross-section shown, a point-wise support for the protrusion 4 is provided within in the recess 14, with which the above-mentioned degrees of freedom can be limited and provided respectively.

Figure 4:
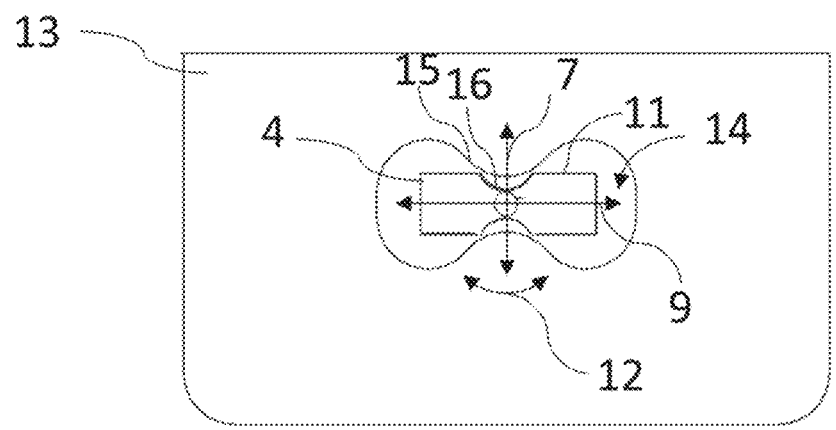
FIG. 4 shows a second embodiment of a bearing.

FIG. 4 shows a bearing, which is similar to the bearing shown in FIG. 3. However, unlike the bearing shown in FIG. 3, the protrusion 4 has a groove 16 on two of its oppositely facing sides. The groove 16 extends parallel to the radial axis. The geometries of the groove 16 and the curvature 15 are chosen such that two oppositely directed surfaces of the protrusion each partially are in two mechanical contacts with one of the curvatures of the inner walls of the recess 14. With such a design it is possible to tilt the protrusion 4 relative to the adjustment element 13 in accordance with the radial rotational degree of freedom 12 and, if necessary, to set a resistance for such a relative movement.

Figure 5:
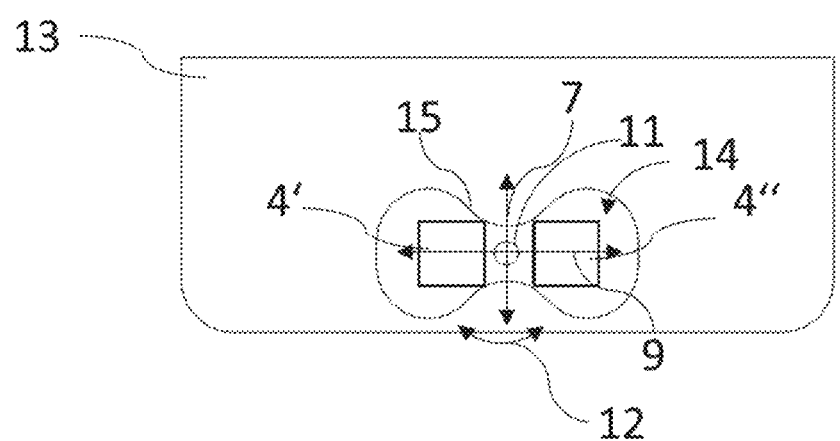
FIG. 5 shows a third embodiment of a bearing.

FIG. 5 shows the cross section of a protrusion, which is subdivided in two sub-protrusions 4' and 4" that extend parallel to each other along the radial axis and wherein a geometry of the curvature 15 and a relative arrangement of the sub-protrusions 4', 4" are chosen such that each of the sub-protrusions 4' and 4" is in a mechanical contact with the two curvatures 15 of the inner walls of the recess 14. In this embodiment, comparable to the description of FIG. 4, it is possible to simultaneously tilt the protrusion 4, which comprises the sub-protrusions 4' and 4" relative to the adjustment element 13 in accordance with the radial rotational degree of freedom 12 and, if necessary, to set a resistance for such a relative movement.

Figure 6:
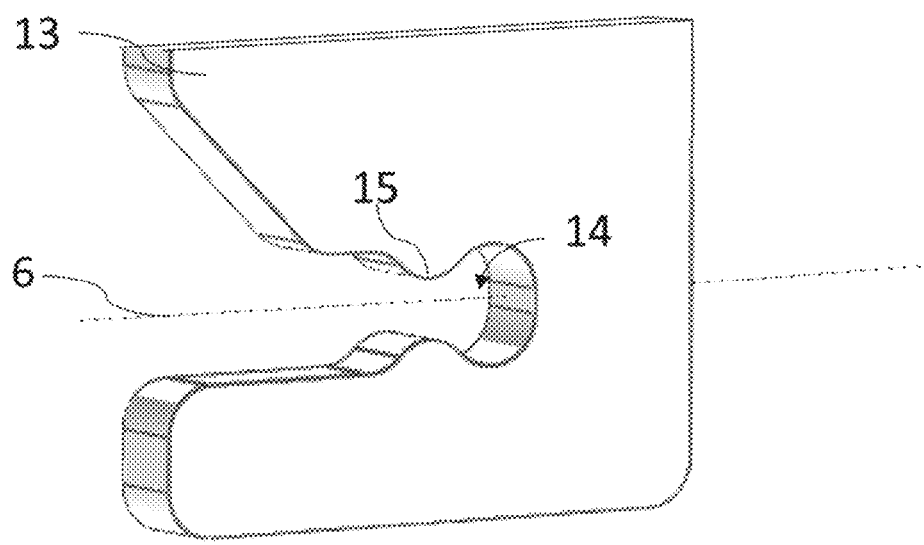
FIG. 6 shows an adjustment element for a fourth embodiment of a bearing.

FIG. 6 shows an adjustment element 13 with a recess 14 that is open on one side along the tangential axis 6. With such an embodiment, the adjustment element 13 and the protrusion 4 or sub-protrusions 4', 4" as described in FIGS. 3-5 can easily be assembled.

Figure 7:
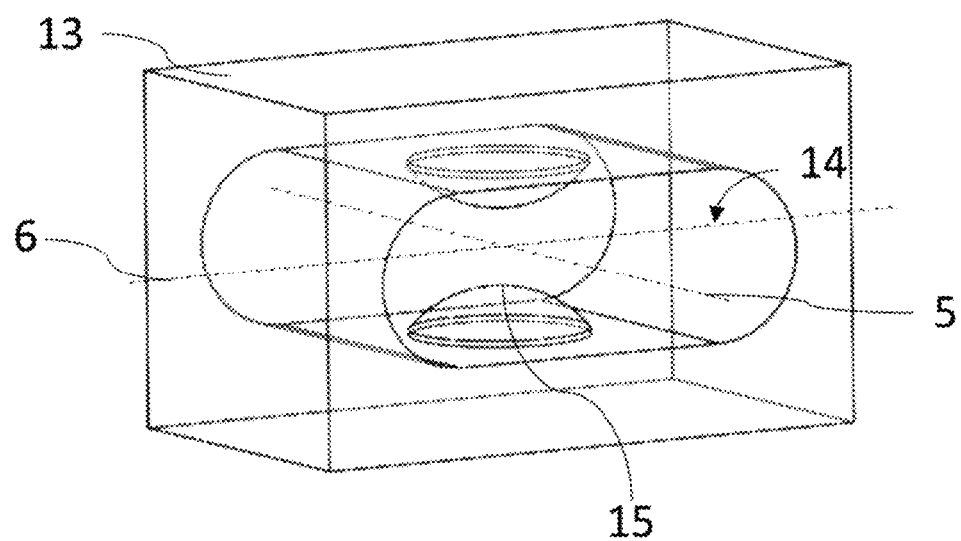
FIG. 7 shows an adjustment element for a fifth embodiment of a bearing.

FIG. 7 shows another embodiment of the adjustment element 13, wherein the curvatures 15 each are part of a spherical geometry. In such an embodiment, it is possible to support the protrusion 4 by a point-like abutment and to limit only the axial translational degree of freedom 7.

Figure 8:
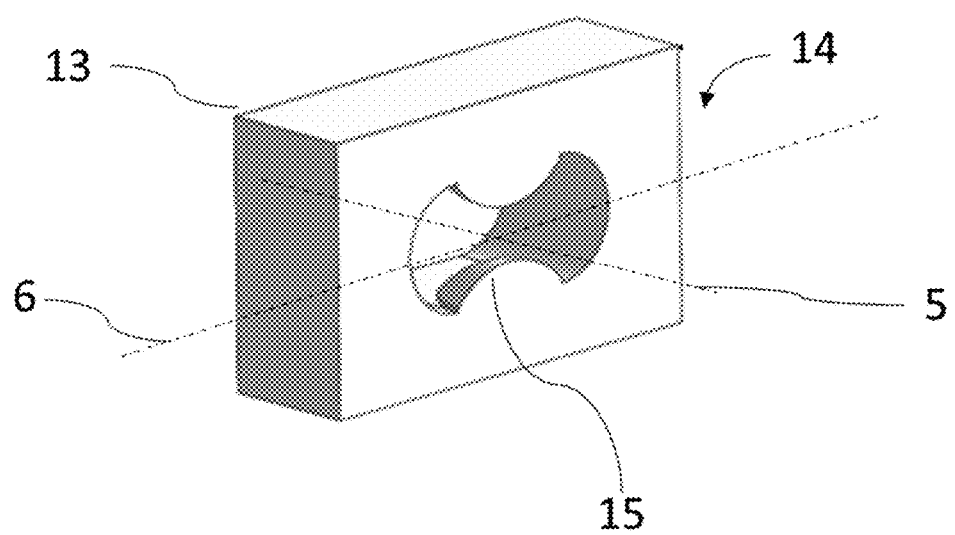
FIG. 8 shows an adjustment element for a sixth embodiment of a bearing.

FIG. 8 shows another embodiment of the adjustment element 13, wherein the curvatures 15 each are part of a semi-spherical geometry. Similarly to the embodiment shown in FIG. 7, it is possible to support the protrusion 4 by a point-like abutment and to limit only the axial translational degree of freedom 7.

Figure 9:
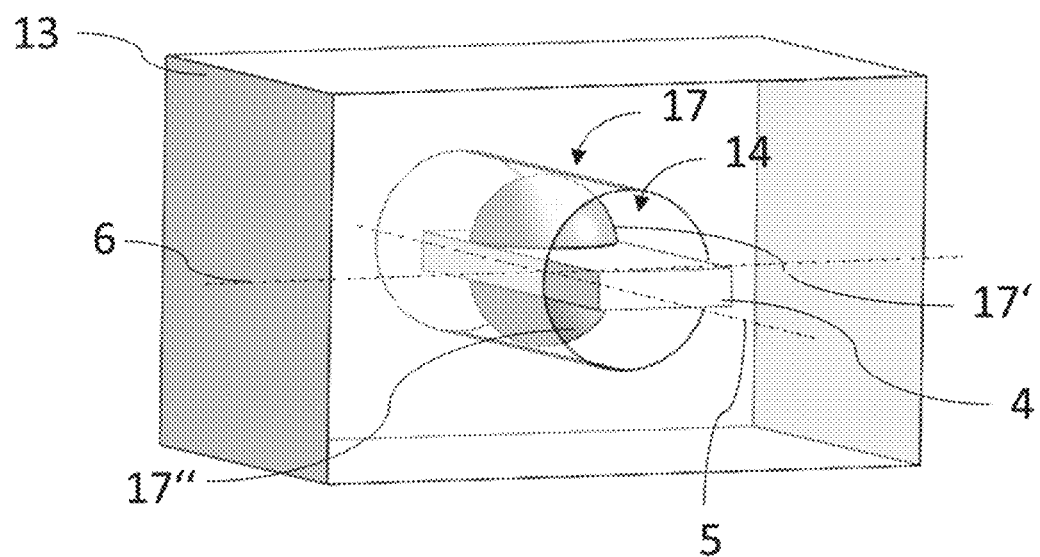
FIG. 9 shows a seventh embodiment of a bearing.

FIG. 9 shows another embodiment, wherein the protrusion 4 comprises a spherical element 17, which is subdivided in two hemispheres 17' and 17" by the protrusion 4 and which are supported within the recess 14. The protrusion has an elasticity that is chosen such that the hemispheres 17' and 17" are biased within the recess 14 against two opposing inner walls of the recess 14.

Figure 10:
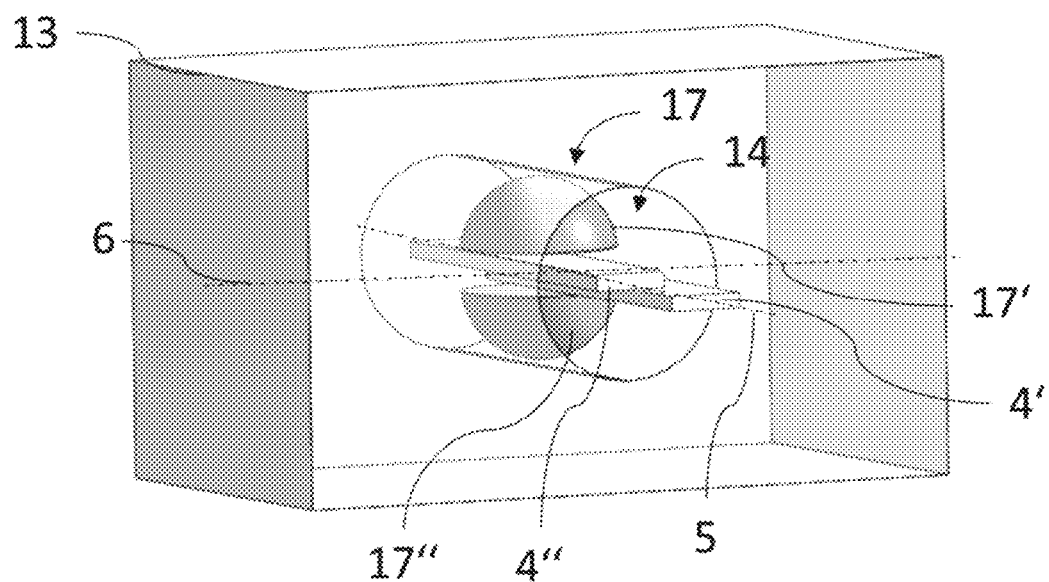
FIG. 10 shows an eight embodiment of a bearing.

FIG. 10 shows another embodiment, wherein the protrusion 4 is subdivided in two sub-protrusions 4', 4" that extend parallel to each other along the radial axis 5 and wherein each of the sub-protrusions 4', 4" is attached to one of the hemispheres 17', 17" and wherein the sub-protrusions 4', 4" are elastically preloaded such that such that the hemispheres 17', 17" are biased within the recess 14 against two opposing inner walls of the recess 14.

Figure 11:
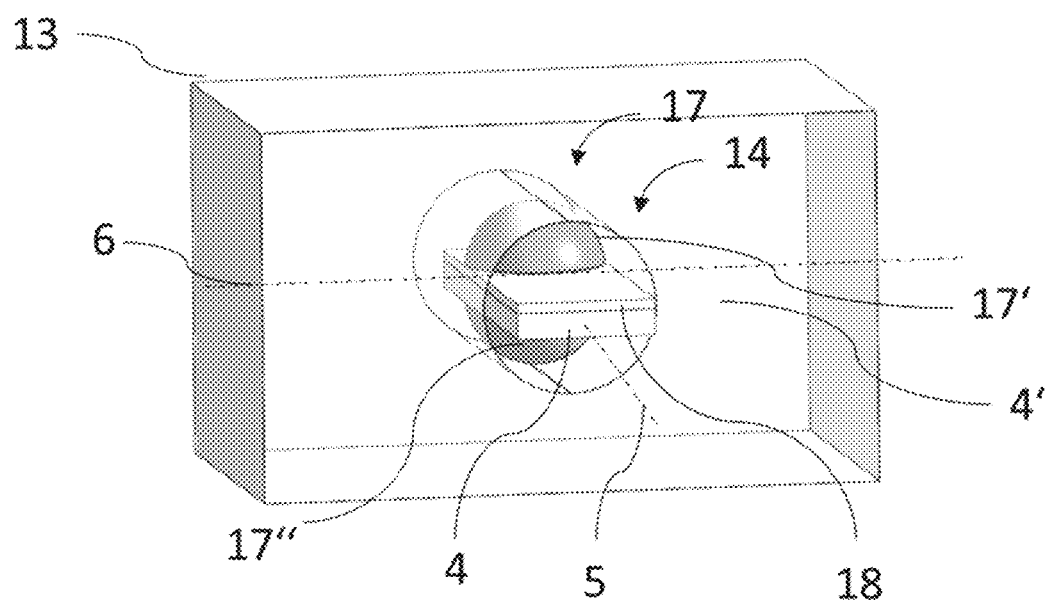
FIG. 11 shows a ninth embodiment of a bearing.

FIG. 11 shows an embodiment, wherein a membrane 18 of the tunable lens is part of the bearing. The protrusion 4 and the membrane 18 at least partially extend parallel to each other within the recess 14 and divide the spherical element 17 into two hemispheres 17', 17". The hemisphere 17' is attached to the membrane 18 and the protrusion 4 is attached to the other hemisphere 17". The membrane 18 is elastically preloaded such that the hemispheres 17', 17" are biased within the recess 14 against two opposing inner walls of the recess 14.

Figure 12:
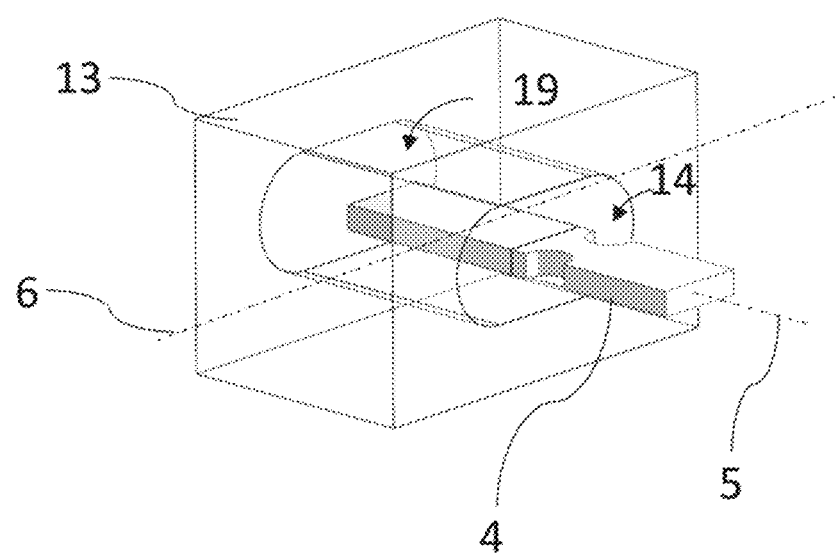
FIG. 12 shows a tenth embodiment of a bearing.

FIG. 12 shows another embodiment, wherein the recess 14 is at least partially filled with a rigid bearing material 19, which encloses the protrusion 4 within the recess 14 about the radial axis 5. The bearing material has a stiffness that is chosen to limit the axial translational degree of freedom 7. The protrusion 4 has a radial rotational elasticity, which is chosen to provide the radial rotational degree of freedom for a relative rotation between the lens shaping element 4 and the adjustment element 13 about the radial axis 5.

Figure 13:
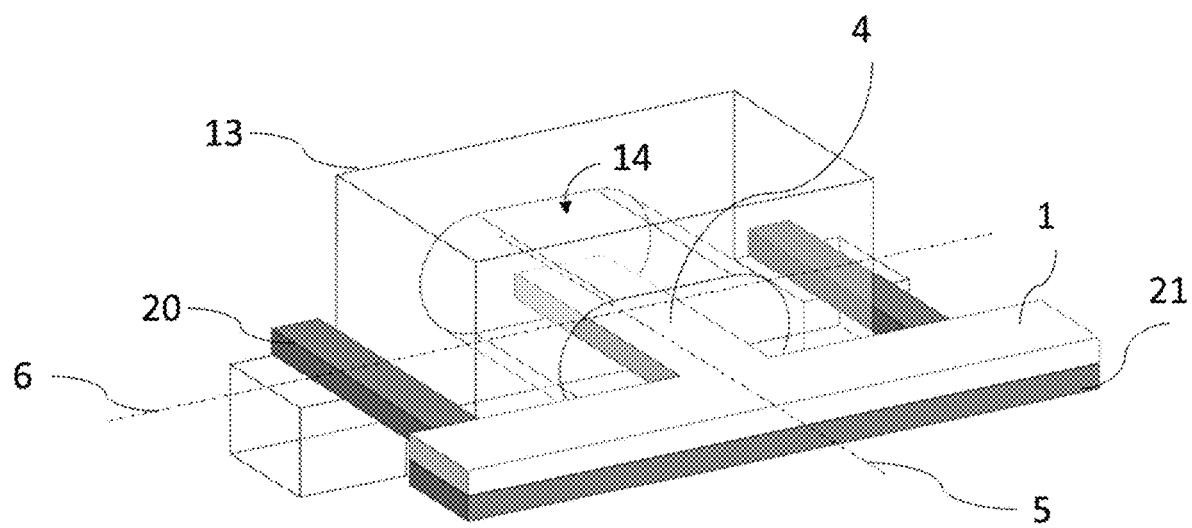
FIG. 13 shows an eleventh embodiment of a bearing.

FIG. 13 shows another embodiment, wherein the recess 14 is shown as a cavity, within which the protrusion 4 can be supported. More particularly, the recess 14 may be designed according to one of the recesses 14 according to FIGS. 4-11.

According to FIG. 13, the bearing comprises two radial booms 20, one of which is provided with a reference sign. The radial booms 20 each are arranged between the lens shaping element 1 and the adjustment element 13, wherein the radial booms each extend parallel to the radial axis 5 and are disposed outside of the recess 14. The elastic booms 20 each have an elasticity, which is chosen to provide the radial rotational degree of freedom and to exert a radial restoring torque about the radial axis 5.

According to the embodiment shown in FIG. 13, the radial booms 20 are integrally connected to a bellow 21 of the tunable lens. The bellow 21 serves as a lateral boundary for the fluid-filled container of the tunable lens and has elastic properties that can be exploited in the manner described above to provide an elastic bearing.

Figure 14:
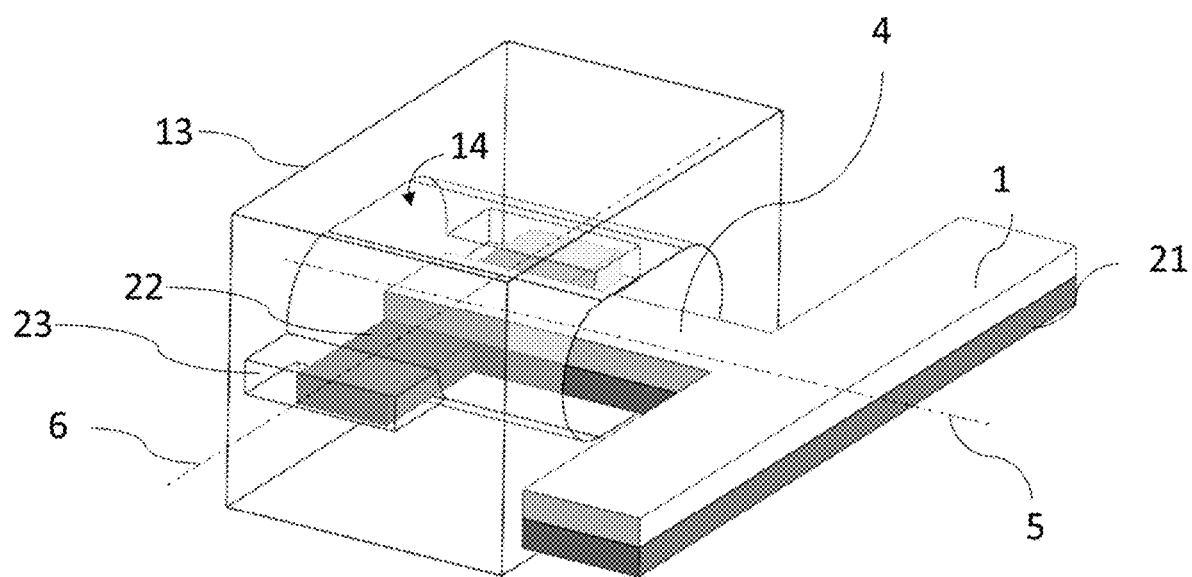
FIG. 14 shows a twelfth embodiment of a bearing.

FIG. 14 shows an embodiment, wherein the bearing comprises two tangential booms 22, one of which is provided with a reference sign. Both tangential booms 22 extend from the protrusion 4 parallel to the tangential axis 6. The tangential booms 22 each engage in a cavity 23 of the recess 14. The tangential booms 21 each have an elasticity, which is chosen to provide the radial rotational degree of freedom and to exert a radial restoring torque about the radial axis 5. Similar to the embodiment shown in FIG. 12, the tangential booms 22 are integrally connected to the bellow 21 of the tunable lens.

We claim:

1. Arrangement for a tunable lens, comprising
   a deformable lens shaping element (1) with a central axis (2) and a radial axis (5) and with a perimetrical edge (3) that extends about the central axis (2) and wherein the perimetrical edge (3) is designed to interact and mechanically deform a membrane of the tunable lens in order to change at least one optical property of the tunable lens;
   further comprising a moveable adjustment element (13), which is mechanically coupled to the lens shaping element (1) by a bearing, wherein
   the bearing limits an axial translational degree of freedom, such that an axial force is transmittable between the lens shaping element (1) and the adjustment element (13) parallel to the central axis (2) and wherein
   the bearing provides a radial rotational degree of freedom (12) for a relative rotation between the lens shaping element (1) and the adjustment element (13) about the radial axis (5).

2. Arrangement according to claim 1, wherein
   the bearing provides a radial translational degree of freedom (11) for a relative translation between the lens shaping element (1) and the adjustment element (13) parallel to the radial axis (5).

3. Arrangement according to claim 1, wherein
   the perimetrical edge (3) defines at least one tangential axis (6) that extends perpendicularly to the radial axis (5) of the lens shaping element (1) and wherein
   the bearing limits a tangential translational degree of freedom (9), such that a tangential force is transmittable between the lens shaping element (1) and the adjustment element along (13) the tangential axis (6).

4. Arrangement according to claim 3,
   with a plurality of bearings, preferably at least six bearings, more preferably eight bearings, wherein
   the bearings are distributed along the perimeter of the lens shaping element (1),
   at least three, preferably four, bearings each limit their respective tangential translational degree of freedom (9) such that a tangential force is transmittable between the lens shaping element (1) and the adjustment element (13) along the respective tangential axis (6), and
   wherein each of the other bearings provides a tangential translational degree of freedom (9) for a relative tangential displacement between the lens shaping element (1) and the adjustment element (13) along the respective tangential axis (6).

5. Arrangement according to claim 1, wherein
the perimetrical edge (3) defines at least one tangential axis (6) that extends perpendicularly to the radial axis (5) of the lens shaping element (1) and wherein
the bearing provides a tangential rotational degree of freedom (10) for a relative rotation between the lens shaping element (1) and the adjustment element (13) about the tangential axis (6).

6. Arrangement according to claim 1, wherein
the adjustment element (13) comprises at least an axial abutment for the lens shaping element (1), which is arranged to limit the axial translational degree of freedom (7).

7. Arrangement according to claim 1, wherein
the bearing has a radial rotational elasticity, which is chosen to provide the radial rotational degree of freedom (12) and to exert a radial restoring torque about the radial axis (5).

8. Arrangement according to claim 2, wherein
the bearing has a radial elasticity, which is chosen to provide the radial translational degree of freedom (11) and to exert a radial restoring force parallel to the radial translational degree of freedom (11)
and/or wherein
the bearing has a tangential abutment for the lens shaping element to limit the tangential translational degree of freedom or wherein a tangential elasticity is chosen to provide the tangential translational degree of freedom (9) and to exert a tangential restoring force parallel to the tangential axis (6),
and/or wherein
the bearing has a tangential rotational elasticity, which is chosen to provide the tangential rotational degree of freedom (10) and to exert a restoring torque about the tangential axis (6).

9. Arrangement according to claim 1, wherein
the lens shaping element (1) comprises at least one protrusion (4) that extends along the radial axis (5), and wherein
the adjustment element (13) comprises a recess (14), in which the protrusion (4) of the lens shaping element (1) engages
and wherein the bearing is at least partially configured such that the protrusion (4) is held in the recess (14), to limit the axial translational degree of freedom (7) and to provide the radial rotational degree of freedom (12).

10. Arrangement according to claim 6,
wherein the bearing comprises a radial boom (20) that is arranged between the lens shaping element (1) and the adjustment element (13), wherein the radial boom (20) extends parallel to the radial axis (5) and is disposed outside of the recess (14), and wherein
the radial boom (20) preferably has at least the radial rotational elasticity, which is chosen to provide the radial rotational degree of freedom (12) and to exert the radial restoring torque about the radial axis.

11. Arrangement according to claim 6,
wherein the bearing comprises a tangential boom (21), preferably two tangential booms, that extend from the protrusion (4) parallel to the tangential axis (6) and wherein the tangential boom (21) engages in a cavity (22) of the recess (14), and wherein
the tangential boom (21) preferably has at least the radial rotational elasticity, which is chosen to provide the radial rotational degree of freedom (12) and to exert the radial centering torque about the radial axis (5).

12. Arrangement according to claim 9,
wherein the protrusion (4) preferably comprises a rectangular cross section and extends parallel to the radial axis (5) and wherein
a contour of the recess (14) has two convex curvatures (15) formed on two opposing inner walls of the recess (14),
and wherein two oppositely directed surfaces of the protrusion (4) each partially are in mechanical contact with one of the curvatures (15) of the inner walls of the recess (14).

13. Arrangement according to claim 12,
wherein the protrusion comprises a groove (16) that extends parallel to the radial axis (5) and wherein the geometries of the groove (16) and the curvature (15) are chosen such that
two oppositely directed surfaces of the protrusion (4) each partially are in two mechanical contacts with one of the curvatures (15) of the inner walls of the recess (14).

14. Arrangement according to claim 12,
wherein the protrusion (4) is subdivided in two sub-protrusions (4', 4") that extend parallel to each other along the radial axis (5) and wherein a geometry of the groove (16) and a relative arrangement of the sub-protrusions (4', 4") are chosen such that
each of the sub-protrusions (4', 4") is in a mechanical contact with the two curvatures (15) of the inner walls of the recess (14).

15. Arrangement according to claim 12,
wherein the recess (14) is open on one side along the tangential axis (6).

16. Arrangement according to claim 12,
wherein at least one of the curvatures (15) at least partly comprises a spherical geometry and/or a cylindrical cross section.

17. Arrangement according to claim 1,
wherein the protrusion (4) comprises a spherical element (17) that is supported within the recess (14).

18. Arrangement according to claim 17,
wherein the protrusion (4) divides the spherical element (17) into two hemispheres (17', 17"), the protrusion having an elasticity chosen such that the hemispheres (17', 17") are biased within the recess (14) against two opposing inner walls of the recess (14).

19. Arrangement according to at least claim 18,
wherein the protrusion (4) is subdivided in two sub-protrusions (4', 4") that extend parallel to each other along the radial axis (5) and wherein each of the sub-protrusions (4', 4") is attached to one of the hemispheres (17', 17") and wherein the sub-protrusions (4', 4") are elastically preloaded such that such that the hemispheres (17', 17") are biased within the recess (14) against two opposing inner walls of the recess (14).

20. Arrangement according to at least claim 17,
comprising a membrane (18) of the tunable lens,
wherein the protrusion (4) and the membrane (18) at least partially extend parallel to each other within the recess (14) and divide the spherical element (17) into the two hemispheres (17', 17"), wherein one of the hemispheres (17', 17") is attached to the protrusion (4) and the other of the hemispheres (17', 17") is attached to the membrane (18),
and wherein the membrane (18) is elastic such that the hemispheres (17', 17") are biased within the recess (14) against two opposing inner walls of the recess (14).

21. Arrangement according to claim 8,
wherein the recess (14) is at least partially filled with a rigid bearing material (19), which is in contact with the protrusion (4), preferably enclosing the protrusion about the radial axis (5), and wherein the rigid bearing material (19) has an axial stiffness that is chosen to limit the axial translational degree of freedom (7) and wherein the protrusion (4) has anelasticity, which is chosen to provide the radial rotational degree of freedom (12) for a relative rotation between the lens shaping element and the adjustment element about the radial axis (5).

22. Arrangement according to claim 1, wherein the lens shaping element (1) comprises at least one recess and wherein the adjustment element comprises a fixation element, which engages in the protrusion of the lens shaping element (1) and wherein the bearing is at least partially configured such that the fixation element is moveably held in the recess of the lens shaping element (1), in order to at least limit the axial translational degree of freedom (7) and to provide the radial rotational degree of freedom (12).

23. Arrangement according to claim 1, wherein the adjustment element (13) and the lens shaping element (1) are connected by the bearing and a means of a flexure, wherein the flexure is elastic such that, in the case of a relative displacement and/or a relative rotation of the adjustment element and the lens shaping element relative to each another, a restoring force and/or a restoring torque is exerted on the lens shaping element in a direction opposite to the relative displacement and/or the relative rotation respectively.

* * * * *